(12) United States Patent
Sedens et al.

(10) Patent No.: US 7,255,329 B1
(45) Date of Patent: Aug. 14, 2007

(54) GATE VALVE WITH OFFSET VALVE STEM

(75) Inventors: Dietmar R. Sedens, Edmonton (CA); Werner Harder, Edmonton (CA)

(73) Assignee: Domino Machine Inc., Edmonton (CA)

( * ) Notice: Subject to any disclaimer, the term of this patent is extended or adjusted under 35 U.S.C. 154(b) by 0 days.

(21) Appl. No.: 11/563,019

(22) Filed: Nov. 23, 2006

(51) Int. Cl.
*F16K 3/30* (2006.01)

(52) U.S. Cl. .................................. 251/327; 251/329

(58) Field of Classification Search ............... 251/326, 251/327, 328, 329
See application file for complete search history.

(56) References Cited

U.S. PATENT DOCUMENTS

| | | | |
|---|---|---|---|
| 2,331,557 A | 10/1943 | Lorehn et al. | |
| 2,510,442 A | 6/1950 | Volpin | |
| 2,524,474 A * | 10/1950 | Randel | 251/323 |
| 2,911,186 A | 11/1959 | Knox | |
| 3,025,034 A | 3/1962 | Zawacki | |
| 3,107,685 A * | 10/1963 | Scaramucci | 251/328 |
| 3,768,744 A | 10/1973 | Bebinger | |
| 4,230,299 A | 10/1980 | Pierce, Jr. | |
| 4,281,819 A | 8/1981 | Linder | |
| 4,513,823 A | 4/1985 | Hynes et al. | |
| 4,685,655 A | 8/1987 | Herd | |
| 4,742,987 A | 5/1988 | Kanamori et al. | |
| 6,293,518 B1 * | 9/2001 | Illy et al. | 251/318 |
| 6,338,469 B1 * | 1/2002 | Kalsi et al. | 251/327 |
| 6,401,747 B1 * | 6/2002 | Cain et al. | 251/327 |

FOREIGN PATENT DOCUMENTS

JP 2002-139160 5/2002

OTHER PUBLICATIONS

Weatherford, "Rod Lock CBM Composite Pumping Tee", brochure excerpt, 2 pages.
Domino Machine, "Integral Production BOP", Information Sheet, 1 page.

* cited by examiner

*Primary Examiner*—John Bastianelli
(74) *Attorney, Agent, or Firm*—Donald V. Tomkins

(57) ABSTRACT

An improved gate valve has a main body defining a flow passage, and a cylindrical gate member, which has a continuous seal disposed within a groove in the gate surface. The gate is actuated by a valve stem movable through a bonnet connected to the main body, with the longitudinal axis of the stem being offset from the longitudinal axis of the gate. The inner end of the stem is retainingly received in a recessed slot in the gate such that the valve stem can rotate relative to the gate and such that longitudinal movement of the stem will cause corresponding movement of the gate. The offset between the stem and gate axes keeps the gate in the same orientation relative to the gate chamber regardless of the gate's longitudinal position.

19 Claims, 3 Drawing Sheets

GATE VALVE WITH OFFSET VALVE STEM

BACKGROUND OF THE INVENTION

Field of the Invention

The present invention relates in general to gate valves, and in particular to mud valves for use in the petroleum industry.

Flat slab gate valves are well known, and they have been used in the petroleum drilling industry for many years. In general, flat slab gate valves are quite simple in design. They use a minimum of components, thus giving them reliable functionality and making them easy to operate and maintain. A typical flat slab gate valve has a cylindrical main body with a flow passage extending between an inlet port and an outlet port, and a cylindrical rubber seal element disposed transversely to the flow passage. The main body also incorporates a gate chamber into which a flat slab gate can be retracted, plus a bonnet section that receives a valve stem operable to move the gate transversely relative to the flow passage, between a closed position in which the gate extends across the flow passage so as to completely block fluid flow between the inlet and outlet ports, and an open position in which the gate is at least partially retracted into the gate chamber so as to allow fluid flow between the inlet and outlet ports. The cylindrical seal element has a slot that allows the gate to pass through it, so that when the valve is in the closed position, fluid pressure on one side of the gate is pressed against one side of the seal element, thus creating a seal to prevent fluid leakage across the gate. The slotted seal element, being incorporated into the valve body, serves to maintain the gate in transverse orientation to the flow passage as it moves between the open and closed positions.

"Mud valves" (as they are commonly called in the petroleum industry) are gate valves purpose-made for various petroleum industry applications, including piping or conduit systems for conveying fluids such as drilling fluids (or drilling "muds"), cement slurries (for cementing well bores), "frac fluids" (for fracturing subsurface oil-bearing or natural gas-bearing formations), water, crude oil, natural gas (sweet or sour), well-treating chemicals, and drilling chemicals. Mud valves are commonly designed specifically for use with abrasive and/or erosive fluids.

It is common to use mud valves that are variants of the basic flat slab gate valve. However, the use of flat slab mud valves can lead to operational problems or even valve failure in certain oilfield applications. One common problem is "sanding" of the gate chamber, which can occur during "fraccing" operations when the mud valve is used in systems for injecting frac fluids (such as frac gel containing large amounts of sand or other particulate "proppant" materials) into a subsurface formation. When it is necessary or desirable to relieve frac fluid pressure from the well, the mud valve is opened to allow frac gel to flow back up the well and into a blowdown tank. As the mud valve is opened, the frac gel passes by the flat slab gate at high velocity. The flat slab gate, which is still pressed against the downstream side of the seal element, allows frac gel and sand to pass between the gate and seal on the upstream side and into the gate chamber, thus impeding gate movement and preventing the valve from opening or closing.

U.S. Pat. No. 2,911,186 (Knox) discloses a gate valve that uses an essentially cylindrical gate rather than a flat slab gate. It is not possible to seal a gate of this configuration in the same fashion as described above for flat slab gates, and the Knox valve addresses this problem by providing a seal element disposed within a continuous groove in the cylindrical gate, the groove being configured such that when the valve is in the closed position, the seal element will seal against adjacent wall surfaces of the flow chamber and gate chamber. More specifically, the seal groove has a semi-circular section adjacent the outer end of the gate (i.e., the end nearest the bonnet), transitioning into a pair of longitudinal legs extending along the sides of the gate, with the ends of the longitudinal legs joining a straight section extending transversely across the inner end of the gate.

Since the seal element moves with the gate, rather than being incorporated into the valve body, proper transverse alignment of the gate cannot be achieved in the same way as for flat slab gates. The Knox valve maintains gate alignment by providing a pair of pins projecting laterally from the valve stem into longitudinal guide slots that extend through the bonnet wall. This arrangement necessitates that the valve stem is non-rotating, so longitudinal movement of the valve stem is enabled by threading the outer end of the stem and providing an internally threaded nut rotatably retained within the bonnet and engaging the stem threads. A handle (such as a handwheel) is connected to the nut such that rotation of the handle rotates the nut around the stem, thereby causing the stem to move longitudinally within the bonnet, in turn moving the cylindrical gate between the open and closed positions according to the direction of handle rotation.

In the Knox valve, the lower portion of the cylindrical gate is bevelled on the upstream and downstream sides of the seal, and the gate also incorporates a pressure equalization passage extending longitudinally through the gate on the side opposite the semi-circular portion of the seal groove. The bevelled sides allow fluid pressures to exert an upward force component that assists in raising the gate. The pressure equalization passage assists in lowering the gate when fluid is flowing from the side opposite the seal, in which case fluids can flow through the passage into the gate chamber and thus exert a downward force on the top of the gate.

An inherent drawback of the Knox valve is the need to provide guide slots through the bonnet wall to maintain gate alignment. These guide slots allow airborne particulates or other contaminants to enter the bonnet cavity, potentially clogging the stem threads and impeding valve operation. The fact that the bonnet cavity is open to the outside (through the guide slots) also creates a potential risk of corrosion on interior surfaces of the bonnet.

A further drawback of the Knox design is that when the valve is in the open or partially open position, a portion of the threaded stem will necessarily project beyond the valve handle, thus creating a safety hazard that could result in serious injury if a worker were to bump into or fall against the handle.

Another drawback of the Knox valve arises from its incorporation of a flat bar (or "fence") that protrudes from the inner wall opposite the gate chamber, transverse to the direction of flow. The primary purpose of the fence is to enhance seal effectiveness by forming a seat against which the seal element will be compressed as the gate moves into the closed position. To prevent a reduction in the effective cross-sectional area of the flow passage, the fence is disposed within a recess in the inner wall of the valve body. While this feature may be advantageous in some applications, it would render the Knox valve unsuitable for many mud valve applications, due to the fact that particulate materials in pumped fluids such as drilling mud and frac gel could accumulate within the recess and thus impede or prevent proper operation of the valve. Moreover, this fence would make the Knox valve particularly unsuitable as a mud valve in fraccing operations, which typically use seating cups made of a very hard urethane. When these seating cups are pulled back out of the hole, the valve cannot have any obstacles or impediments (like the fence) in the seating cups' path; otherwise, either the seating cups or the gate seal will become damaged or destroyed.

Accordingly, there is a need for a gate valve suitable for use in "mud valve" applications, effective to mitigate or prevent the "sanding" problem that can arise in fraccing operations, while also preventing the entry of contaminants into the valve bonnet. There is a further need for such a gate valve that can be operated throughout its full range of gate movement without the valve stem projecting beyond the valve handle. There is a yet further need for such a gate valve that ensures effective sealing between the gate and internal valve surfaces without requiring a protruding seal seat element or an associated recess in which particulate matter might accumulate. The present invention is directed to these needs.

BRIEF DESCRIPTION OF THE INVENTION

In general terms, the present invention is a gate valve that uses a substantially cylindrical gate member with a seal element disposed within a continuous groove in the gate surface. The valve has a valve stem formed with (1) a smooth cylindrical outer section that is longitudinally movable through gland means associated with the outer end of the valve bonnet, (2) a threaded intermediate section that engages a threaded bore associated with the inner end of the bonnet, and (3) a gate-engagement section comprising a valve stem "button" separated from the intermediate section by a transition element, which preferably (but not necessarily) will be of smooth cylindrical configuration.

The gate valve of the present invention, in its preferred embodiment, is particularly distinguished by the fact that the longitudinal axis of the valve stem is offset from the longitudinal axis of the cylindrical gate, rather than being coincidental with the gate axis as in prior art gate valves. The outer end of the gate (i.e., the end toward the bonnet) has a recessed slot configured to receive the valve stem button such that the valve stem is free to rotate relative to the gate, while also retaining the button in the longitudinal direction such that longitudinal movements of the valve stem will cause corresponding movements of the gate. A valve handle (of any suitable configuration) is connected to the outermost end of the outer section of the valve stem, which projects form the bonnet. Rotation of the handle causes the valve stem to move longitudinally within the bonnet due to engagement of the threaded section of the valve stem with the threaded bore of the bonnet. The valve stem button rotates within its recessed slot in the cylindrical gate, while also moving the gate axially within the gate chamber in accordance with longitudinal movements of the stem. Due to the lateral offset between the stem and gate axes, the cylindrical gate remains at all times in a substantially fixed angular orientation relative to the gate chamber regardless of the gate's longitudinal position therein, thus ensuring that the seal element remains oriented for optimal sealing effectiveness when the valve is in the closed position.

The valve of the present invention is particularly suitable for use in mud valve applications subject to a "sanding" risk, by virtue of its use of a cylindrical gate rather than a flat slab gate. Due to the use of a seal element recessed into the cylindrical gate, the clearance between the gate and the gate chamber wall can be significantly less than for a conventional slab-type gate; in fact, the movement of the cylindrical gate, when exposed to full fluid pressure, can be restricted to a few thousandths of an inch. This minimal clearance reduces the potential for frac gel and sand to migrate past the gate and into the gate chamber.

The valve of the present invention can be adapted for either bi-directional or unidirectional fluid flow. By designing the seal element in such a way as to contain well pressure on the upstream side of the valve, the valve operator can clear any sand from the gate chamber with compressed air, even while the valve is under pressure and in line. This feature is enabled by providing a compressed air inlet port and an outlet port in the walls of the gate chamber, so that sand or other contaminants can be blown out of the gate chamber by introducing compressed air into the gate chamber through the inlet port and blowing the contaminants out the outlet port.

BRIEF DESCRIPTION OF THE DRAWINGS

Embodiments of the invention will now be described with reference to the accompanying figures, in which numerical references denote like parts, and in which.

DETAILED DESCRIPTION OF THE PREFERRED EMBODIMENT

Figure 1:
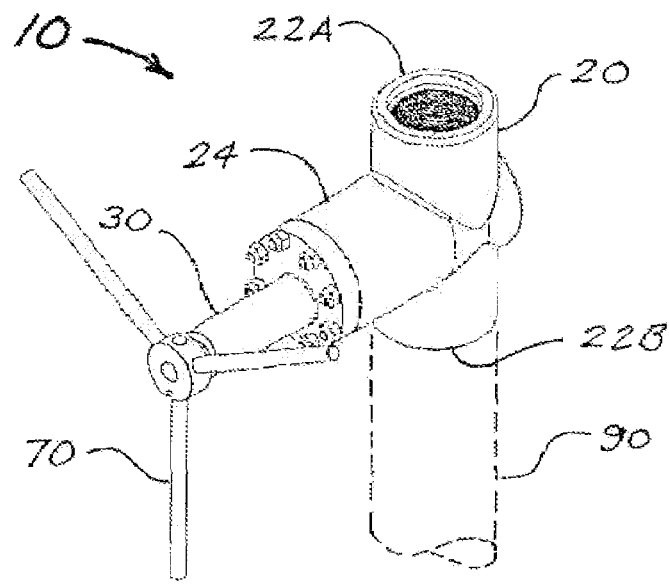
FIG. 1 is an isometric view of a gate valve in accordance with a preferred embodiment of the present invention.
Figure 2:
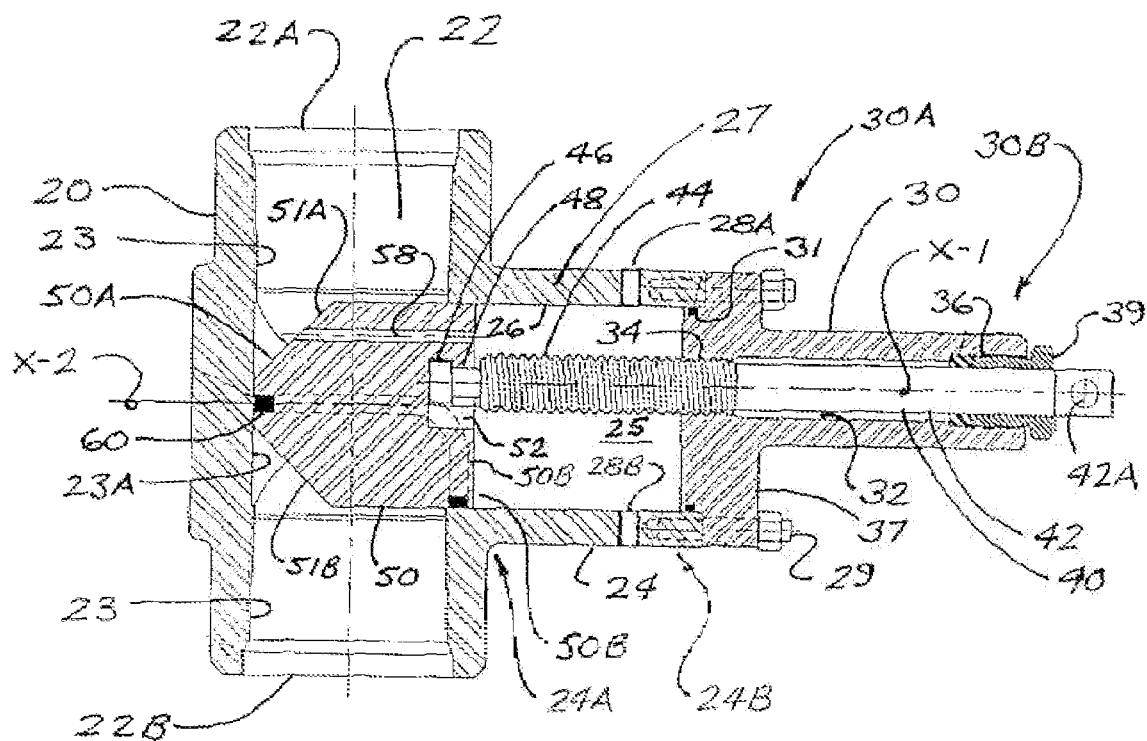
FIG. 2 is a longitudinal cross-section through the gate valve of FIG. 1.
Figures 3, 4:
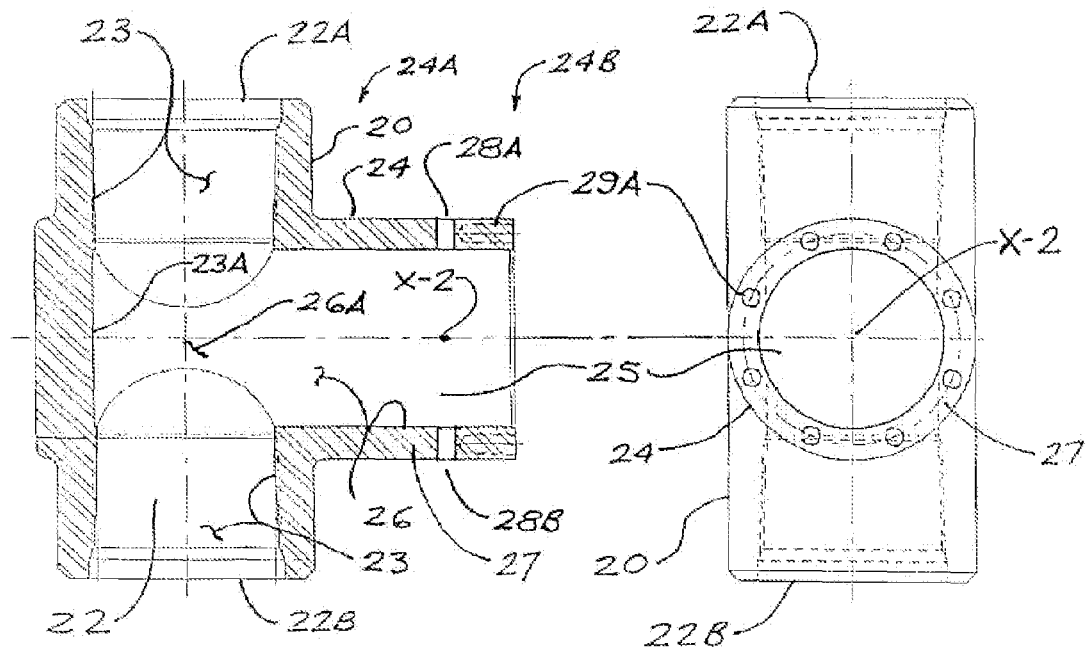
FIG. 3 is a longitudinal cross-section through the main body of the gate valve of FIG. 1.
FIG. 4 is an end view of the gate housing section of the valve body.

FIGS. 1 to 9 illustrate various details of the preferred embodiment of a gate valve 10 in accordance with the present invention. Referring to FIGS. 2 and 3, gate valve 10 includes a main body 20 defining a flow passage 22 extending between a first port 22A and a second port 22B, with flow passage 22 having inner wall surfaces 23. FIG. 1 shows valve 10 oriented in accordance with a typical "mud valve" application, in which second port 22B of valve 10 is directly connected to a well casing 90 extending vertically out of the ground. In such applications, flow passage 22 will be oriented substantially vertically as in FIG. 1, such that flow passage 22 can be considered as having upper and lower ends corresponding to first and second ports 22A and 22B respectively. Accordingly, the adjectives "upper" and "lower" may be used in this relative sense for convenience to describe and locate various components of valve 10. However it will be appreciated that valve 10 could be installed in different orientations, so proper interpretation of the adjectives "upper" and "lower" will be context-dependent, according to the orientation of valve 10 in a given application.

Adjoining (or integral with) main body 20 in a medial region between first port 22A and a second port 22B is a gate housing section 24 having an inner end 24A, an outer end 24B. Gate housing 24 has a gate housing wall 27 defining a cylindrical gate chamber 25, which is in fluid communication with flow passage 22 and has inner wall surfaces 26.

Figures 5, 6:
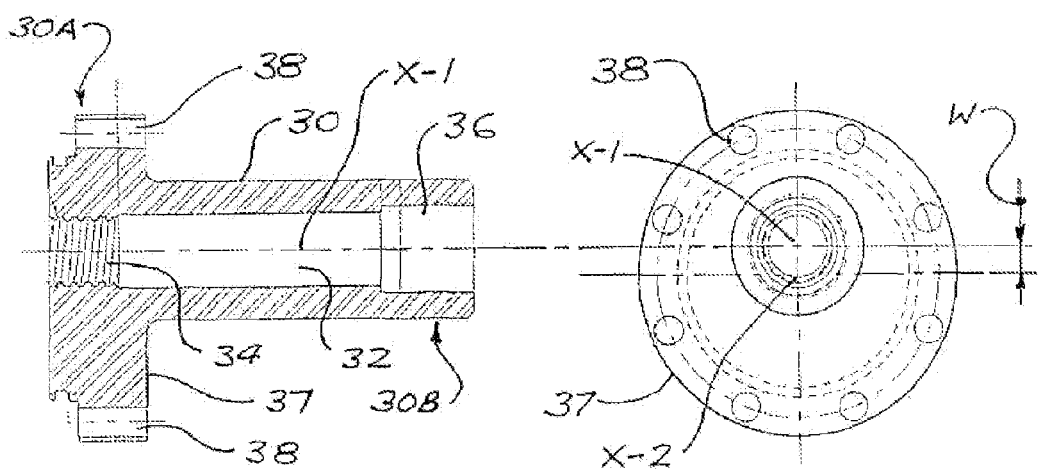
FIG. 5 is a longitudinal cross-section through the bonnet of the gate valve.
FIG. 6 is an end view of the bonnet.

Referring to FIGS. 2 and 5, gate valve 10 also includes a bonnet 30 having an inner end 30A and an outer end 30B, with a longitudinal bore 32 extending between inner end 30A and outer end 30B. Inner end 30A of bonnet 30 is mountable to outer end 24B of gate housing section 24 such that the longitudinal axis X-1 of bore 32 is offset from, but parallel to, the longitudinal axis X-2 of gate chamber 25 by a select offset dimension W. As best understood from FIGS. 2-6, mounting of bonnet 30 is preferably facilitated by providing bonnet 30 with a mounting flange 37 at inner end 30A, with bolt holes 38, enabling bonnet 30 to be mounted to outer end 24B of gate housing section 24 by means of machine screws 29 inserted through holes 38 into mating threaded bores 29A in gate housing wall 27 at outer end 24B, preferably with an associated O-ring or gasket 31 as shown in FIG. 2. However, this means of connection is not essential; bonnet 30 could be connected to gate housing section 24 in other functionally equivalent ways without departing from the present invention.

Referring to FIG. 2, bonnet bore 32 has a threaded section 34 adjacent to inner end 30A of bonnet 30. Adjacent to outer end 30B of bonnet 30, bore 32 has a gland section 36 adapted to receive gland means 39 through which an elongate valve stem 40 may be sealingly disposed, as further described below. Valve stem 40 has a smooth cylindrical outer section 42, threaded intermediate section 44 that engages threaded bore 34 of bonnet 30, and a valve stem "button" 54 separated from threaded intermediate section 44 by a transition element 48 which is preferably but not necessarily cylindrical, and which is smaller in cross-sectional area than button 54. Button 54 is preferably of cylindrical form, but this is not essential to the invention, as button 54 could take different forms without materially affecting the operation of valve 10.

When valve 10 is assembled, as shown in FIG. 2, cylindrical outer section 42 of valve stem 40 is disposed within gland means 39, with the longitudinal axis of valve stem 40 being coincident with axis X-1 of bore 32 of bonnet 30. Gland means 39 allows for longitudinal movement of cylindrical outer section 42 while providing an effective seal to prevent entry of contaminants into bore 32. Gland means 39 may be of any suitable known type, as will be readily appreciated by persons skilled in the field of the invention. As shown in FIG. 2, threaded intermediate section 44 of valve stem 40 engages threaded section 34 of bonnet bore 32, such that rotation of valve stem 40 will cause longitudinal movement of valve stem 40 within bonnet 30.

Cylindrical outer section 42 is of sufficient length to extend beyond outer end 30B of bonnet 30 when valve 10 is closed as well as when it is open, with the extending portion having means for attachment of a handle 70 (of any suitable type) for rotating valve stem 40. In the embodiment illustrated in FIG. 2, the handle attachment means is shown as a handle-mounting hole 42A, but persons skilled in the art will appreciate that there are various alternative ways in which a handle could be mounted to valve stem 40.

Figures 7, 8:
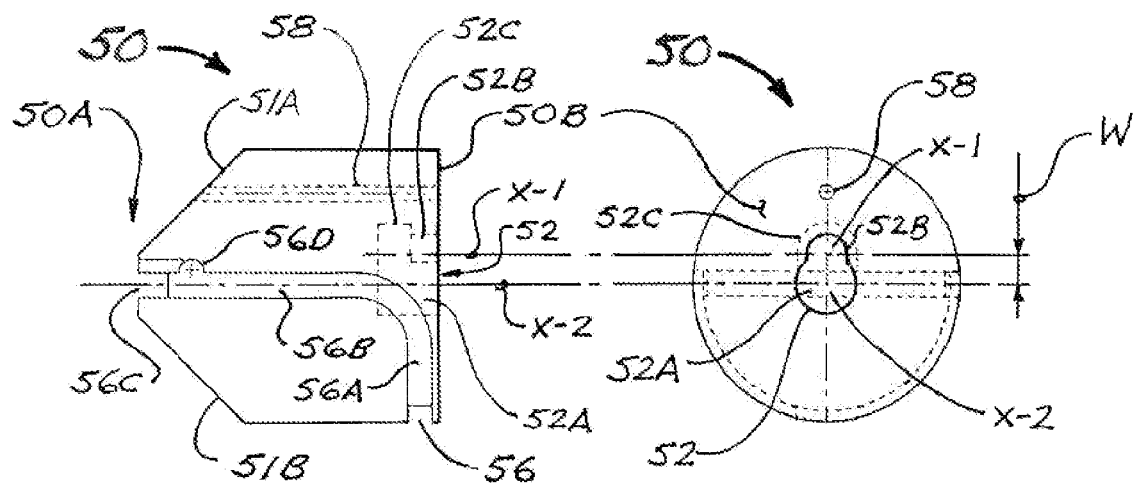
FIG. 7 is a side view of the cylindrical gate of the gate valve, showing the seal groove.
FIG. 8 is an end view of the outer end of the cylindrical gate, illustrating the recessed slot for receiving valve button.

Referring to FIGS. 2, 7, and 8, gate valve 10 has a cylindrical gate 50 disposed and movable within cylindrical gate chamber 25, with the longitudinal axis of cylindrical gate 50 being coincident with longitudinal axis X-2 of gate chamber 25. Cylindrical gate 50 has an inner end 50A (disposed toward flow passage 22) and an outer end 50B (disposed toward gate chamber 25). In preferred embodiments, a compound slot 52 is formed into outer end 50B of cylindrical gate 50, comprising:

- an entrance leg 52A, generally centered on axis X-2 and sized to permit insertion of button 54 of valve stem 40;
- an offset leg 52B contiguous with entrance leg 52A, extending inward from outer end 50B of cylindrical gate 50, generally centered on axis X-1, and sized to receive transition element 48; and
- a recess 52C contiguous with both entrance leg 52A and offset leg 52B but underlying offset leg 52B, recess 52C being sized so that button 54 can be inserted into entrance leg 52A and then shifted laterally by offset distance W into recess 52C, thereby disposing transition element 48 within offset leg 52B so that button 54 is rotatably retained within recess 52C.

Having reference to FIG. 2, it may be readily understood that rotation of valve stem 40 will result in longitudinal movement of valve stem 40 within bonnet 30. Due to the rotatable retention of valve stem button 54 within compound slot 52, as described above, longitudinal movement of valve stem 40 causes cylindrical gate 50 to be either pushed toward the closed position within flow passage 22 or pulled into a retracted position within gate chamber 25, depending on the direction of rotation of valve stem 40. Persons skilled in the art of the invention will appreciate that alternative details may be devise for engaging valve stem 40 with gate 50 such that valve stem can rotate while being effective to move gate 50 longitudinally within gate chamber 25 as valve stem 40 moves longitudinally within bonnet 30. Accordingly, the present invention is not to be considered limited to the particular details expressly described and illustrated herein for providing this functionality, and all functionally equivalent structures are to be considered as coming within the scope of the invention.

Referring to FIGS. 2 and 7, cylindrical gate 50 has a seal groove 56 for receiving a continuous seal element 60 for preventing leaking of fluid across gate 50 when valve 10 is in the closed position. As seen in FIG. 7, seal groove 56 preferably has a semi-circular section 56A adjacent to outer end 50B of gate 50. Semi-circular section 56A of seal groove 56 preferably extends around the lower side of cylindrical gate 50 as shown in the Figures, but this is not essential; optionally, it could extend around the upper side of gate 50. Semi-circular section 56A of seal groove 56 transitions into a pair of longitudinal legs 56B extending along the sides of gate 50, with the ends of longitudinal legs 56B joining a straight section 56C extending transversely across inner end 50A of gate 50.

Figure 9:
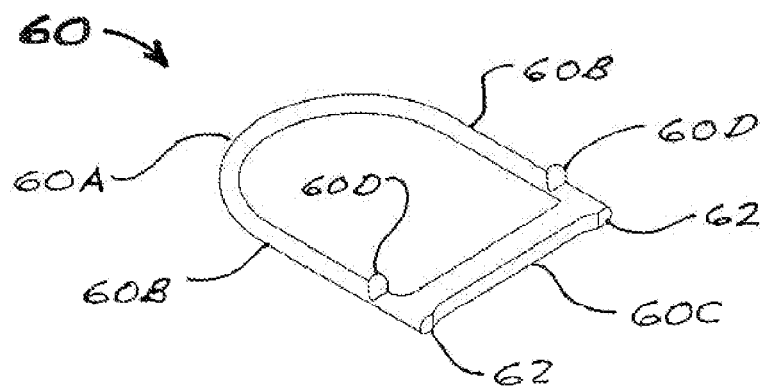
FIG. 9 is an isometric view of a flexible seal element adapted to be positioned in the seal groove of the cylindrical gate.

FIG. 9 illustrates an exemplary embodiment of seal element 60, with sections 60A, 60B, and 60C corresponding to, and adapted to be received within, sections 58A, 58B, and 58C, respectively, of seal groove 56 as described above. It may be readily appreciated that curved section 60A of seal element 60, when disposed within semi-circular section 56A of seal groove 56, will seal against cylindrical inner wall surface 26 of gate chamber 25 regardless of the position of gate 50 within gate chamber 25.

In preferred embodiments of the invention, seal element 60 is made of a flexible material such as synthetic rubber (e.g., nitrile) or other flexible sealant material having good resistance to hydrocarbons and other chemicals. However, other materials may be used for seal element 60 to suit particular applications, and the present invention is in no way limited by the use of any particular seal materials.

As may be appreciated from FIG. 3, the diameter of gate chamber 25 in the preferred embodiment is slightly larger than that of flow passage 22, such that cylindrical inner wall surface 26 of gate chamber 25 intercepts inner wall surface 23 of flow passage 22 so as to form a "pinched" section 26A of gate chamber wall surface 26 extending toward a substantially flattened section 23A of flow passage walls surface 23 opposite gate chamber 25. Accordingly, sections 60B of seal element 60 disposed within longitudinal legs 56B of seal groove 56 will seal against gate chamber wall surface 26 (and/or pinched section 26A thereof) regardless of the position of gate 50 within gate chamber 25. When gate 50 is in its closed position (i.e., blocking fluid flow within flow passage 22), straight section 60C of seal element 60 will seal against flat section 23A of flow passage wall surface 23.

As shown in FIG. 9, straight section 60C of seal element 60 may optionally have enlarged end portions 62 for enhancing seal effectiveness. As gate 50 moves into the closed position and presses straight section 60C of seal element 60 against flat section 23A of flow passage wall surface 23, enlarged end portions 62 will be urged into the corner regions where pinched sections 26A of gate chamber wall surface 26 meet flat section 23A of flow passage wall surface 23, thus enhancing seal effectiveness in these regions.

In a particularly preferred embodiment of the invention, seal element 60 has one or more retainer bosses 60D adapted to be received in mating notches 56D in seal groove 56. Retainer bosses 60D help to maintain seal element 60 in its proper position with seal groove 56, and when positioned as shown in FIGS. 7 and 9, they counteract any tendency of straight section 60B of seal element 60 to be displaced outward from section 56C of seal groove 56 due to elasticity of seal element 60, when gate 50 is being retracted toward gate chamber 25.

Although inner end 50A of cylindrical gate 50 has been described and illustrated herein as having a substantially straight portion where it meets and seals against the portion of flow passage wall surface 23 opposite gate chamber 25, it will be appreciated that cylindrical gate 50 could be provided in other configurations without departing from the basic concept and principles of the invention. For example, inner end 50A of cylindrical gate 50 could be hemispherical or otherwise curved, with flow passage wall surface 23 being correspondingly contoured for sealing with gate 50 in the closed position.

In preferred embodiments, as shown in FIGS. 2 and 7, cylindrical gate 50 is bevelled or chamfered on one or both of its upper and lower sides adjacent to inner end 50A, so as to form upper bevelled edge 51A and/or lower bevelled edge 51B. This facilitates the opening of valve 10, because fluid pressure acting against a bevelled edge 51A or 51B will have a component tending to push gate 50 into gate chamber 25. In one alternative embodiment, as shown in FIGS. 2 and 7, a pressure equalization channel 58 extends through gate 50 between outer end 50B and bevelled edge 51A. This feature facilitates closing of valve 10 when fluid is flowing downward through flow passage 22 (i.e., from first port 22A toward second port 22B). Fluids may pass through channel 58 into gate chamber 25, wherein they will exert pressure against outer end 50B of gate 50, tending to push gate 50 into flow passage 22. For applications in which fluids contain suspended particulate matter, channel 58 will preferably be of relatively small diameter, so that gaseous fluid components can readily pass through into gate chamber 25 and exert pressure against outer end 50B of gate 50, while particulates will tend to be carried with the main fluid stream through flow passage 22 rather than diverting into channel 58.

In the preferred embodiment shown in FIGS. 2 and 3, gate housing section 24 has a compressed air inlet port 28A and an outlet port 28B, spaced apart from each other and extending through gate housing wall 27, and provided with suitable fittings (e.g., compressed air nipple for inlet port 28A and removable plug for outlet port 28B) of any suitable known types. These ports make it conveniently possible to clean out any particulates or other contaminants that might pass into gate chamber 25 without having to disassemble valve 10 or take it out of service. For example, into the situation illustrated in FIG. 1 where valve 10 is mounted to a well casing 90, and gate 50 is closed as in FIG. 2 with well casing 90 fully pressurized (for example, after injection of frac fluid), compressed air may be injected into gate chamber 25 through inlet port 28A to blow out any accumulated matter in gate chamber 25 through outlet port 28B, while not in any way affecting the ability of gate 50 to resist and contain upward fluid pressure from wellbore 90.

In FIGS. 2 and 3, inlet and outlet ports 28A and 28B are shown diametrically opposite each other and adjacent to outer end 24B of gate housing section 24, but this specific arrangement is not essential. Inlet and outlet ports 28A and 28B could be in different relative positions without departing from the principles and concept of the invention, although it is preferable for ports 28A and 28B to be positioned sufficiently close to outer end 24B of gate housing section 24 so that they will not be covered up by gate 50 when in its retracted position.

It will be readily appreciated by those skilled in the art that various modifications of the present invention may be devised without departing from the essential concept of the invention, and all such modifications are intended to be included in the scope of the claims appended hereto. It is to be especially understood that the invention is not intended to be limited to illustrated embodiments, and that the substitution of a variant of a claimed element or feature, without any substantial resultant change in the working of the invention, will not constitute a departure from the scope of the invention.

In this patent document, the word "comprising" is used in it non-limiting sense to mean that items following that word are included, but items not specifically mentioned are not excluded. A reference to an element by the indefinite article "a" does not exclude the possibility that more than one of the element is present, unless the context clearly requires that there be one and only one such element.

The embodiments of the invention in which an exclusive property or privilege is claimed are defined as follows:

1. A gate valve comprising:
   (a) a valve body having:
      a.1 a flow passage extending between a first port and a second port;
      a.2 a gate housing section having an inner end and an outer end, and gate housing wall defining a cylindrical gate chamber transversely intersecting and in fluid communication with the flow passage;
   (b) a generally cylindrical gate member having an inner end and an outer end disposed within the gate chamber and movable between:
      b.1 an open position, in which a fluid can flow through the flow passage between the first and second ports; and
      b.2 a closed position, in which the gate member blocks fluid flow between the first and second ports;

(c) an elongate valve stem operable to move the gate between the open and closed positions, with the longitudinal axis of the valve stem being offset from but parallel to the longitudinal axis of the cylindrical gate member, and with a first end of the valve stem engaging the gate member such that the valve stem is freely rotatable, but longitudinally retained, relative to the gate member; and (d) valve stem mounting means whereby rotation of the valve stem will move the valve stem longitudinally relative to the valve body.

2. The gate valve of claim 1, wherein the valve stem mounting means comprises a bonnet section having:

(a) an inner end and an outer end, said inner end being mountable to the outer end of the gate housing;

(b) a longitudinal bore having a threaded section proximal to the inner end of the bonnet, said longitudinal bore being offset from the longitudinal axis of the cylindrical chamber; and (c) gland means associated with said longitudinal bore, proximal to the outer end of the bonnet;

where the valve stem comprises:

(d) a smooth cylindrical outer section longitudinally movable through the gland means;

(e) a threaded intermediate section that engages a threaded bore associated with the inner end of the bonnet; and (f) a gate-engagement section comprising a valve stem button separated from the intermediate section by a transition element;

and wherein:

(g) the outer end of the gate member has a compound slot for retainingly receiving the valve stem button, such that the valve stem is offset from the longitudinal axis of the gate member, and such that rotation of the valve stem will result in longitudinal movement of the gate member within the cylindrical chamber, without imparting rotational forces to the gate member.

3. The gate valve of claim 1, further comprising seal means for preventing fluid leakage around the gate member when the gate member is in the closed position.

4. The gate valve of claim 3, wherein the seal means is a seal element disposed within a continuous seal groove formed in the gate member.

5. The gate valve of claim 4, wherein the seal element is made of a flexible material.

6. The gate valve of claim 5, wherein the flexible material is a synthetic rubber.

7. The gate valve of claim 6, wherein the synthetic rubber comprises nitrile.

8. The gate valve of claim 1, wherein the gate housing section has a compressed air inlet port and an outlet port extending through the gate housing wall.

9. The gate valve of claim 1, wherein the inner end of the cylindrical gate has a bevelled face on either the upstream or downstream side of the gate.

10. The gate valve of claim 9, wherein a channel extends longitudinally through the cylindrical gate between the outer end of the gate and the bevelled face on the inner end of the gate.

11. A gate valve comprising:

(a) a valve body having:

a.1 a flow passage extending between a first port and a second port;

a.2 a gate housing section having an inner end and an outer end, and defining a cylindrical gate chamber transversely intersecting and in fluid communication with the flow passage;

(b) a bonnet having:

b.1 an inner end and an outer end, said inner end being mountable to the outer end of the gate housing;

b.2 a longitudinal bore having a threaded section proximal to the inner end of the bonnet, said longitudinal bore being offset from the longitudinal axis of the cylindrical chamber; and b.3 gland means associated with said longitudinal bore, proximal to the outer end of the bonnet;

(c) an elongate valve stem having an inner end and an outer end, and comprising:

c.1 a smooth cylindrical outer section longitudinally movable through the gland means;

c2 a threaded intermediate section that engages a threaded bore associated with the inner end of the bonnet; and c.3 a gate-engagement section comprising a valve stem button separated from the intermediate section by a transition element;

(d) a generally cylindrical gate member disposed within the gate chamber and movable between:

d.1 an open position, in which a fluid can flow through the flow passage between the first and second ports; and d.2 a closed position, in which the gate member blocks fluid flow between the first and second ports;

wherein d.3 the gate member has an inner end and an outer end, said outer end being disposed toward the bonnet; and d.4 said outer end has a compound slot for retainingly receiving the valve stem button, such that the valve stem is offset from the longitudinal axis of the gate member, and such that rotation of the valve stem will result in longitudinal movement of the gate member within the cylindrical chamber, without imparting rotational forces to the gate member; and (e) a handle connected to the outer end of the valve stem, for rotating the valve stem to move the gate member between the open and closed positions.

12. The gate valve of claim 11, further comprising seal means for preventing fluid leakage around the gate member when the gate member is in the closed position.

13. The gate valve of claim 12, wherein the seal means is a seal element disposed within a continuous seal groove formed in the gate member.

14. The gate valve of claim 13, wherein the seal element is made of a flexible material.

15. The gate valve of claim 14, wherein the flexible material is a synthetic rubber.

16. The gate valve of claim 15, wherein the synthetic rubber comprises nitrile.

17. The gate valve of claim 11, wherein the gate housing section has a compressed air inlet port and an outlet port extending through the gate housing wall.

18. The gate valve of claim 11, wherein the inner end of the cylindrical gate has a bevelled face on either the upstream or downstream side of the gate.

19. The gate valve of claim 18, wherein a channel extends longitudinally through the cylindrical gate between the outer end of the gate and the bevelled face on the inner end of the gate.

* * * * *